United States Patent [19]
Chacon

[11] 3,938,249
[45] Feb. 17, 1976

[54] SPRINKLER HEAD CLEANING DEVICE

[76] Inventor: Rene Aragon Chacon, 20225 Sherman Way, Canoga Park, Calif. 91306

[22] Filed: Nov. 25, 1974

[21] Appl. No.: 526,606

[52] U.S. Cl. ............... 30/300; 30/DIG. 7; 172/25
[51] Int. Cl.² .................................... B26B 27/00
[58] Field of Search ........ 30/300, 310, 287, DIG. 7; 172/13, 18, 25, 41

[56] References Cited
UNITED STATES PATENTS

| | | | |
|---|---|---|---|
| 1,746,463 | 2/1930 | Elder | 30/300 |
| 2,723,453 | 11/1955 | Espitallier | 30/310 |
| 3,143,176 | 8/1964 | Drane | 172/25 X |
| 3,548,497 | 12/1970 | Bickett | 30/300 |
| 3,747,213 | 7/1973 | Green | 30/300 |
| 3,747,214 | 7/1973 | Bohlman | 30/300 |

Primary Examiner—Harold D. Whitehead
Assistant Examiner—J. C. Peters
Attorney, Agent, or Firm—Roger A. Marrs

[57] ABSTRACT

A powered device is disclosed herein for removing soil, weeds or the like from the immediate area beneath a sprinkler head which includes a central shaft having a forward end engageable with the sprinkler head as a guide and a U-shaped member fixed on the shaft so as to rotate therewith. Each leg of the U-shaped member extends downwardly to clear the peripherial edge of the circular sprinkler head. A cutting blade is angularly secured to each end or leg of the U-shaped member so that a forward portion thereof extends underneath the sprinkler head and so that a rearward portion extends outwardly in a diverging relationship to the sprinkler head. Power drive is releasably coupled to the shaft for rotation of the cutting blades about the sprinkler head.

5 Claims, 4 Drawing Figures

U.S. Patent  Feb 17, 1976  3,938,249
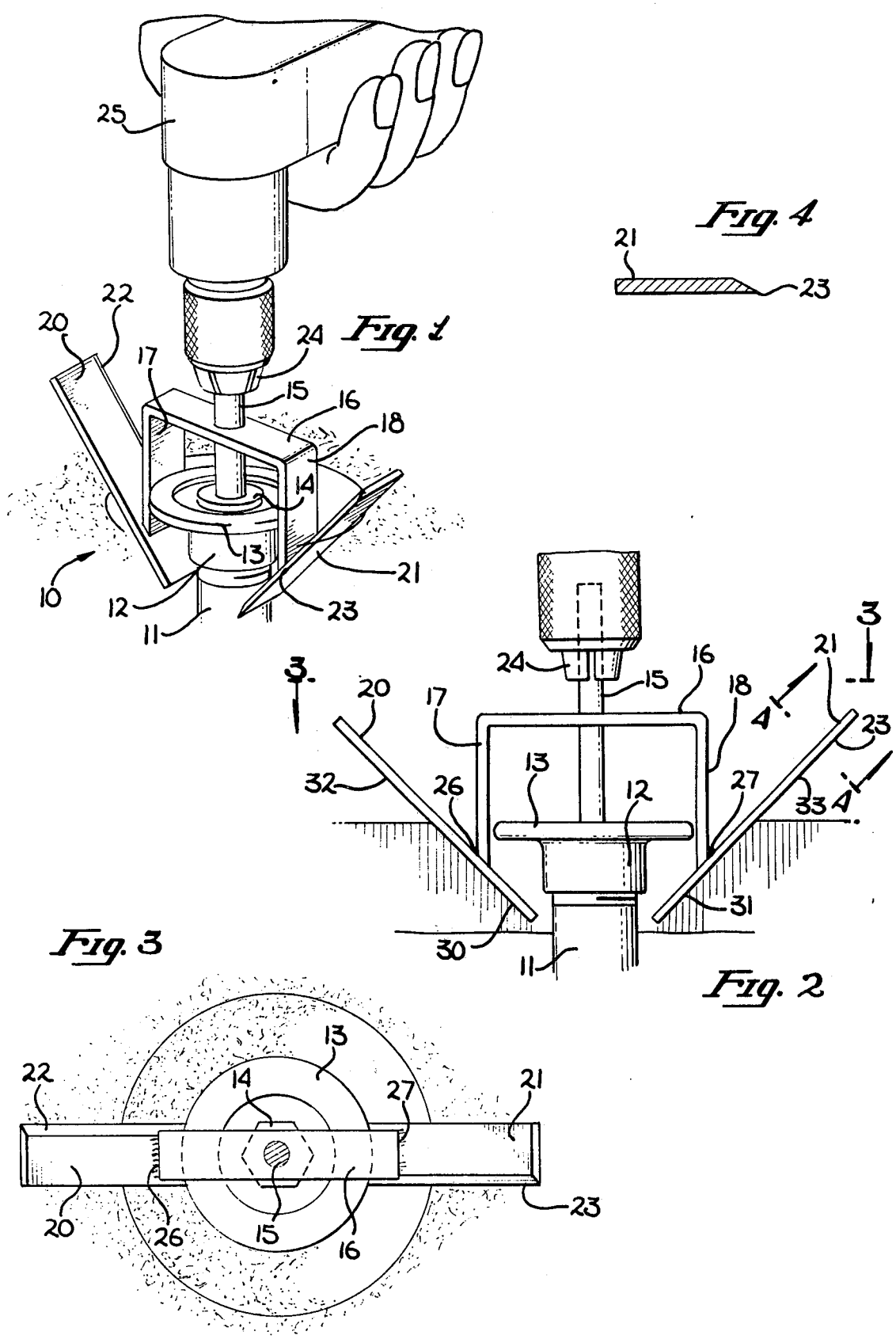

SPRINKLER HEAD CLEANING DEVICE

BACKGROUND OF THE INVENTION

1. Field of the Invention

This invention relates to debris and earth devices and more particularly to a novel cleaning device for effecting the removal of earth, weeds, plant root systems, etc. from a predetermined area beneath and surrounding an installed sprinkler head.

2. Brief Description of the Prior Art

It is conventional practice in planted areas, such as lawns, to provide a sprinkling system incorporating a plurality of sprinkler heads which are usually embedded in the earth. In order for the sprinkler to properly spray or disperse water in its intended pattern, earth, soil, foreign matter and other debris must be removed from the area of the sprinkler head so that it will not interfere with the dispersal pattern of the water. Undesirable growth expands to cover the sprinkler head and eventually interferes with the water sprinkling distribution. Many of the undesirable weed and plant growth include elaborate and complex root systems. Other growth incorporate roots of tough and string fiberous texture that are difficult to sever or remove from the surrounding earth. Because of these weed characteristics and others, difficulties have been encountered when employing conventional gardening implements that result in continuous growth of the weed or else these implements result in greatly enlarged holes caused by the removal of earth in which the weed growth is embedded. Furthermore, numerous chemical preparations have been employed for deterring, removing or destroying a variety of undesirable weed and plant growth that appear in sprinkler head surrounding areas. However, chemical preparations do not result in the removal of earth, foreign matter or the like which serve as a growing medium for weeds and plants.

Therefore, a long standing need has been present to provide a novel clean implement for not only destroying weed and plant growth in the immediate surrounding area of the sprinkler head but results in the removal of earth, debris and other foreign matter that may interfere with the water distribution pattern of the sprinkler head.

SUMMARY OF THE INVENTION

Accordingly, the above difficulties and problems are obviated by the present invention which provides a rotatable shaft incorporating a U-shaped member carrying a bladed cutting element on the end of each leg of the member that engages and pulverizes the weed growth, soil and earth bed for the growth and any other debris or matter in the immediate vicinity of the sprinkling head. The extreme end of the shaft serves as a guide by engaging the center of the sprinkling head so that the cutting blades radiate outwardly to rotate about the peripheral edge of the sprinkler head while downwardly extending portions of the cutting blades project in a converging manner toward the central axis of the sprinkling head to loosen earth and sever root systems beneath the sprinkling head. The cutting element may be forceably urged into the earth to any desired depths sufficient to destroy the weed system consistent with the engagement of the end of the shaft with the sprinkling head. For rotating the shaft and the cutting elements, a feature of the invention resides in the employment of a hand held electric motor power unit which is detachably coupled to the end of the rotating shaft opposite to its end engageable with the sprinkling head. By employing power rotation of the shaft, the cutting blades or cutting elements may be readily driven through relatively tough and stringy root fibers.

Therefore, it is among the primary objects of the present invention to provide a novel cleaning device incorporating a rotatable shaft carrying a pair of cutting elements which are adapted to be forceably urged into cutting communication with weed growth surrounding a sprinkler head so as to grind and pulverize the growth including its root system.

Another object of the present invention is to provide a novel cleaning and grinding device which provides a rotatable cutting element which may be moved by power means around the surrounding area of a sprinkler head and beneath the sprinkler head for a short distance to effect the pulverization of weed growth and to effect earth removable.

Still another object of the present invention is to provide a novel cleaning device for cleaning the immediate area surrounding and beneath a sprinkler head having a rotatable cutting blade adapted to be inserted in the ground about the sprinkler head and which includes a stabilizing or guiding means carried on the device for supporting the device against the sprinkler head.

Yet another object of the present invention is to provide a novel sprinkler head cleaning device which incorporates a powered rotatable cutting element adapted to be inserted into the ground surrounding the sprinkler head and further including outwardly extending cutting blades on opposite sides thereof for severing the earth and soil under the sprinkler head as well as the root system so that weeds and other plant growth are destroyed.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a perspective view of the novel sprinkler head cleaning device incorporating the present invention;

FIG. 2 is a side elevational view of the cleaning device shown in FIG. 1;

FIG. 3 is a top plan view of the device as taken in the direction of arrows 3—3 of FIG. 2; and FIG. 4 is an enlarged fragmentary view of a cutting member employed in the device of FIG. 2 and taken in the direction of arrows 4—4 thereof.

DESCRIPTION OF THE PREFERRED EMBODIMENT

Referring to FIG. 1, the novel cleaning device or apparatus of the present invention as indicated in the general direction of arrow 10 and is shown in a typical application for cleaning the area surrounding and beneath a conventional sprinkling device. The device includes a water supply pipe 11 on the end of which is preferably attached a sprinkler head indicated by numeral 12. The sprinkler head includes a circular flange 13 having a diameter greater than the pipe 11 so that a substantial area exists beneath the flange in which dirt, debris and weed growth must be removed. The sprinkler head 12 also includes a nut 14 having a central opening therein for exposing the nozzle for the sprinkler. It is this nozzle that generally becomes clogged after dirt, weed growth or the like has progressed over and around the flange 13.

The device 10 of the present invention includes a rotatable shaft 15 having a selected end thereof which engages with the hole or at least the center of the nut 14 as a guide and stabilizing means. Fixedly attached to the shaft 15, there is provided a U-shape member 16 having downwardly pending legs 17 and 18 which are arranged 180° from each other and outwardly extend immediately beyond the periphery of the flange 13. Secured to the respective ends of the legs 17 and 18, there is provided a pair of cutting elements or members 20 and 21 which are angularly disposed with respect to each other and include cutting edges 22 and 23 associated with the blades 20 and 21 respectively. Cutting edges 22 and 23 are on opposite sides of the cutting member 20 and 21 so that as the shaft 15 and member 16 are rotated, the cutting edges will face the area intended to be cut. The end of shaft 15 is adapted to be detachably connected with a chuck 24 mounted on the end of a drive shaft (not shown) suitably driven by an electrical motor unit mounted within a hand grip casing 25. The power motor unit held by housing 25 as well as the drive shaft and chuck 24 may take the form of any suitable or conventional hand actuated power source.

Referring now in detail to FIG. 2, it can be seen that the cutting blades 20 and 21 are angularly disposed with respect to each other so as to diverge outwardly from the water supply pipe 11. The respective blades are attached to the end of the U-shape member 16 by suitable means such as welds 26 and 27.

It is also to be noted from the illustration in FIG. 2 that each of the blade members 20 and 21 includes a lower portion 30 and 31 respectively which extend downward from the end of the U-shaped member 16 towards the water supply pipe 11. By this construction, any dirt, weeds, plant growth or the like is pulverized and may readily be removed from under the sprinkler head 12. Furthermore, an upper portion of these blades as identified by numerals 32 and 33 are coextensive with the lower portions 30 and 31 and project outwardly and upwardly above the surrounding ground level. It is the customary practice to install sprinkler heads so that the flange 13 is either lower or at the same level with the surface of the surrounding ground. By providing the upper portion which extend above the ground surface, additional cutting areas is assured for severing leafy plants or growth that might otherwise interfere with distribution of the water from the sprinkler head. In general, the cutting members 20 and 21 outwardly diverge from the water pipe 11.

Referring now in general to FIG. 3, it can be seen that the shaft 15 is aligned with respect to the nut 14 so that the device pin is stablized and centered so that the cutting members 20 and 21 as well as U-shaped member 16 will rotate about the flange 13 with the shaft 16 at the center of rotation. It can also be seen that the cutting edges 22 and 23 are on opposite sides of the respective cutting blades 20 and 21 so that the cutting edges face in the direction of device rotation. In FIG. 4, a sectional view of the blade 21 is shown on which the cutting edge 23 is formed.

In actual operation, the upper end of shaft 15 is introduced to chuck 24 of a conventional hand drill motor 25. Next, the opposite end of shaft 15 is placed against the nut 14, or in some instances within a small hole provided in the center of the nut, and the lower portion 30 and 31 of the cutting member 20 and 21 are positioned around the side and below the flange 13 of the sprinkler head. Power is then introduced to the motor and shaft 15 will rotate in a clockwise direction whereby cutting edges 22 and 23 will pulverize any plants, root systems, dirt or the like that is in the vicinity of the sprinkler head and the end of water supply pipe 11. Once the cutting has taken place and pulverizing of the area complete, the tool may be removed and, if desired, the pulverized or ground up dirt and plant growth can be removed.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In combination with a water sprinkler head having a circular flange supported on a water supply pipe, a cleaning device comprising:
   a shaft;
   a U-shaped member secured to said shaft mid-way between the opposite ends of said shaft and having a pair of parallel legs downwardly depending from the opposite ends of a cross bar and said legs terminating below the underside of said flange;
   a pair of cutting blades secured to the respective terminating ends of said U-shaped member legs in an angularly upwardly diverging direction;
   stabilizing means for supporting and aligning said cutting blades with respect to said flange whereby said blades travel in a circular path above and beneath said flange;
   each of said cutting blades having a lower portion extending angularly downward with respect to said water supply pipe under said circular flange and having an upper portion extending upwardly in coextensive relationship with said lower portion;
   said cutting blades having opposing ends terminating in close proximity to the external surface of said water supply pipe; and
   power means detachably coupled to a selected end of said shaft for imparting powered rotational force thereto.

2. The invention as defined in claim 1 wherein each of said cutting blades includes an upper portion extending upwardly in a diverging manner from said water supply pipe and further extending over the surface of the surrounding ground.

3. The invention as defined in claim 2 wherein said shaft includes an end opposite to its end engaged with said power means for guiding and bearing said opposite end against the center of said sprinkler head.

4. The invention as defined in claim 3 including cutting edges provided on each of said cutting blades and said cutting edges facing in the direction of rotation of said shaft.

5. The invention as defined in claim 4 wherein the ends of said U-shaped member are joined to said pair of cutting blades at a location below said flange when said shaft is engaged against the center of said sprinkler head.

* * * * *